Dec. 2, 1969          H. A. PÜSCHNER                3,481,266
           APPARATUS FOR THE STERILIZING OF PRODUCTS
                    Filed Dec. 17, 1964
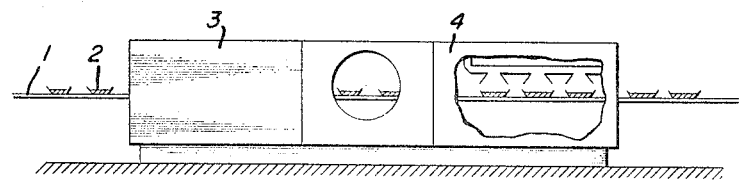
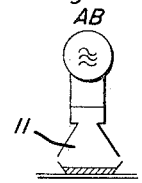
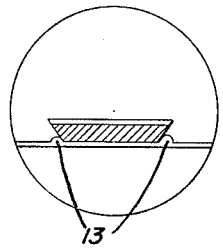      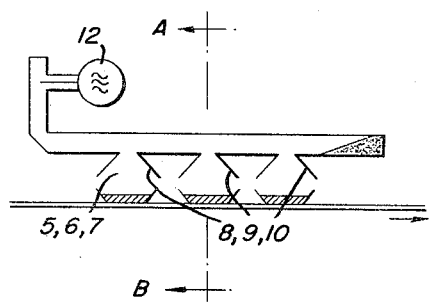
                                           INVENTOR.
                                      HERBERT A. PÜSCHNER United States Patent Office 3,481,266
Patented Dec. 2, 1969

3,481,266
APPARATUS FOR THE STERILIZING OF PRODUCTS
Herbert A. Püschner, Bremen, Germany, assignor to Atlas-Werke Aktiengesellschaft, Bremen, Germany, a corporation of Germany
Filed Dec. 17, 1964, Ser. No. 419,245
Claims priority, application Germany, Dec. 17, 1963, A 44,808
Int. Cl. B65h 55/06; A23l 3/32
U.S. Cl. 99—253          3 Claims

ABSTRACT OF THE DISCLOSURE

An apparatus for continuously and successively electromagnetically heating foodstuff and pharmaceutical products. A conveyor belt successively moves portions of foodstuff or other products to and from a zone that is aligned with an electromagnetic radiator in turn coupled to a microwave generator. The radiator is open and designed to generate microwave energy at portions in the zone in synchronism with the movement of the conveyor belt. Means are also provided for packaging the portions before being introduced into the zone with a microwave permeable wrapper.

The invention relates to a device for the sterilizing of products, for example foodstuffs and pharmaceutical goods, by means of heat, the products being partly or wholly packed in containers made of sheet material.

Sterilization procedures have been proposed in which perishable products are rendered durable by heating to a sterilization temperature between 100° and 130° C., by means of hot water or hot steam, in counter-pressure autoclaves and sterilization vessels. The duration of treatment of the goods depends on when the necessary temperature for killing the micro-organisms is reached in the core of the goods. With convective heat transfer, the treatment may last for thirty minutes or longer and during this time, water may penetrate through the covering layer for example nitrocellulose or Saran R of the sheet material to the carrier layer for example cellophane. The hydrophilic carrier layer thus swells, and as a result of this, the covering layer separates therefrom. Moreover, a subsequent drying is necessary. With subsequent drying, deposits of lime may remain on the surface of the packing. Furthermore, damage by means of scratches or dents can easily occur when placing the packings in the vessel.

It is an object of the present invention to provide a sterilization apparatus in which the heat necessary for the sterilization is generated by conversion of electromagnetic energy, preferably in the high frequency or microwave range. With dielectric heating, when using microwave energy, the heat is produced directly in the goods, by the conversion of electromagnetic energy. Moreover, heating by means of electromagnetic energy has advantages due to the essentially faster heating and the small structural size of the heating device.

The method according to the invention, as a result of the short heating time for the sterilizing and as a result of the treatment being effected at normal atmospheric pressure, offers the advantageous possibility of working in a continuous operation. Accordingly, the packing procedure and the sterilizing procedure can follow one after the other in a continuous flow.

If the goods are wholly or partly packed in cellophane compound foil, then they can be sterilized before or after the packing. If metallic containers are used, for example shallow receptacles of deep drawn aluminum, the sterilizing may be effected before or after charging of the goods into the container, but in any case before closing of the container.

The above and other objects and advantages of the invention will be clear from the following description taken with reference to the accompanying diagrammatic drawings which are given by way of example and in which:

FIG. 1 is an elevation view, partly broken away, of a continuous treatment packing and sterilizing apparatus;
FIG. 1a is a view illustrating a detail of FIG. 1;
FIG. 1b is a further view illustrating a detail of FIG. 1; and
FIG. 1c is a sectional view along the line A–B of FIG. 1b.

The goods to be sterilized pass on a conveyor belt 1 in the form of individual portions 2, firstly into a packing apparatus 3. In this, the goods are hermetically closed with the aid of a cellophane compound foil, and then pass into a sterilizing apparatus 4, in which they pass through radiation zones 5, 6 and 7, which are established by means of microwave energy from electromagnetic radiators 8, 9 and 10, which are in continuous operation and which are supplied with energy by a microwave generator 12.

In order to ensure that the individual portions 2 come to lie in the correct position below the openings 11 of the radiators 8, 9 and 10, holding devices 13 (see FIG. 1a) are provided on the conveyor belt 1, the individual portions 2 being disposed in these, the devices 13 being advanced by a stepping mechanism not shown in the drawing, in such a manner that they stop for predetermined rest times with the portions exactly below the openings 11 of the radiators (see FIG. 1b).

It will be appreciated that in addition to the short sterilizing times which can be achieved, the advantage is gained that the arrangement operates with normal atmospheric pressure.

Modifications and other embodiments are possible within the scope of the claims appended hereto. More particularly, the sterilizing of the goods can be alternatively effected before the packing, or when packing in rigid containers which are closeable by means of lids, can be effected after the filling of the containers but before the closing. With metallic containers and container lids, the sterilizing must be effected at the latest before the closing of the packing, so that it is necessary for a device for closing the packing to be arranged subsequent to the sterilizing apparatus.

The sterilizing device may be combined into a structural unit with a preceding or subsequent packing device.

I claim:

1. An apparatus for heat sterilization of foodstuff and pharmaceutical products wherein said heat is generated by conversion of electromagnetic energy comprising, a conveyor belt having means for carrying said products in the form of individual portions in spaced positions successively to a heating zone, means for generating a sterilizing electromagnetic field at said zone comprising at least one radiator in the form of an open, hollow, microwave guide, means coupling said radiator to a microwave generator adapted to generate continuous power during a sterilization period in which one of said portions is in said zone, said opening of said radiator corresponding in shape and dimension to the plan outline of said portion, means positioning said opening in radiating alignment with said zone, means for moving said belt in successive steps, the steps of which correspond in length to the distance between corresponding points of successive positions, means for successively aligning said portions with said opening of said radiator and said zone, and a packing device for wrapping said portions in packaging which is permeable to microwave energy.

2. Apparatus according to claim 1 wherein said packing device has means for hermetically closing said portions with non-metallic sheet material before sterilizing procedure.

3. Apparatus according to claim 1 wherein said packing device has means for packing portions before sterilization in metal packaging open towards said opening of said hollow radiator, and an additional packing device arranged to close said metal packaging after sterilization.

References Cited

| 2,576,862 | 11/1951 | Smith | 99—253 X |
| 2,635,051 | 4/1953 | Giacinto | 99—249 |
| 2,965,015 | 12/1960 | Huchok | 99—357 X |

ROBERT W. JENKINS, Primary Examiner

U.S. Cl. X.R.

99—357